(12) United States Patent
Wang et al.

(10) Patent No.: US 7,583,213 B2
(45) Date of Patent: Sep. 1, 2009

(54) SIGNAL PROCESSING SYSTEM CAPABLE OF CHANGING SIGNAL LEVELS

(75) Inventors: Wen-Chi Wang, Yun-Lin Hsien (TW); Bing-I Chang, Tainan Hsien (TW)

(73) Assignee: Realtek Semiconductor Corp., HsinChu (TW)

( * ) Notice: Subject to any disclaimer, the term of this patent is extended or adjusted under 35 U.S.C. 154(b) by 24 days.

(21) Appl. No.: 11/670,426

(22) Filed: Feb. 2, 2007

(65) Prior Publication Data
US 2007/0183513 A1 Aug. 9, 2007

(30) Foreign Application Priority Data
Feb. 9, 2006 (TW) ............................. 95104401 A

(51) Int. Cl.
*H03M 1/00* (2006.01)
(52) U.S. Cl. .................... 341/139; 341/143; 341/144
(58) Field of Classification Search ............. 341/139, 341/143, 144
See application file for complete search history.

(56) References Cited
U.S. PATENT DOCUMENTS

| | | | | |
|---|---|---|---|---|
| 4,818,996 A | * | 4/1989 | Kimura | .................... 341/144 |
| 5,087,914 A | * | 2/1992 | Sooch et al. | ................. 341/120 |
| 5,977,896 A | * | 11/1999 | Kohdaka et al. | ............ 341/143 |
| 6,163,286 A | * | 12/2000 | Lee et al. | ..................... 341/143 |
| 6,278,392 B1 | | 8/2001 | Nestler | |
| 6,278,750 B1 | | 8/2001 | Yu | |
| 6,404,367 B1 | | 6/2002 | Van der Zwan | |
| 6,522,273 B1 | * | 2/2003 | Fei et al. | ..................... 341/139 |
| 6,914,546 B2 | * | 7/2005 | Easwaran et al. | ........... 341/143 |
| 6,985,099 B1 | | 1/2006 | Luz | |
| 7,148,829 B2 | * | 12/2006 | Inukai | ........................ 341/139 |

FOREIGN PATENT DOCUMENTS

| | | |
|---|---|---|
| GB | 2 244 612 A | 12/1991 |
| GB | 2 403 386 A | 12/2004 |
| TW | 497093 | 8/2002 |

* cited by examiner

*Primary Examiner*—Khai M Nguyen
(74) *Attorney, Agent, or Firm*—Winston Hsu

(57) ABSTRACT

A signal processing system for changing a level of an input signal to generate an output signal is disclosed. The signal processing system includes a shifter, a sigma-delta modulator, and a level adjuster. The shifter is utilized for receiving the input signal and for bit-shifting the input signal according to a first predetermined gain to generate a first adjustment signal. The sigma-delta modulator is utilized for generating the output signal according a second adjustment signal and the first adjustment. The level adjuster is utilized for adjusting a level of the output signal according to a second predetermined gain to generate the second adjustment signal.

14 Claims, 2 Drawing Sheets

SIGNAL PROCESSING SYSTEM CAPABLE OF CHANGING SIGNAL LEVELS

BACKGROUND OF THE INVENTION

1. Field of the Invention

The invention relates to a signal processing system, and more particularly, to a signal processing system capable of changing levels of input signals to generate output signals.

2. Description of the Prior Art

A digital-to-analog converter (DAC) is often used in a front-end of many signal processing mechanisms to convert digital signals into analog signals for following backend signal processing. Therefore, the DAC plays an important role in the audio field for the rapid developments of the audio/video media.

The audio signal is different from an ordinary transmitted signal. The highest frequency of the audio signal is approximately 20 KHz. Analyzing the audio signal is easier than analyzing a high-frequency signal. Therefore, a higher digitization accuracy is required for audio signals. In order to meet this requirement, a delta-sigma modulator is introduced.

A conventional delta-sigma modulator includes an integrator, a quantizer, and an adder. The integrator, coupled to the quantizer, receives and integrates an input signal x, and then transmits an integrated result to the quantizer. The quantizer quantizes the integrated result to generate a digital output signal $S_{out}$, which is further sent to the signal input end via a negative feedback path. After being processed by the adder, the digital output signal $S_{out}$ is sent to the input end of the integrator. Since the structures and the functions of the integrator, the quantizer, and the adder are well known to one skilled in the art, further description is omitted for brevity. Please note that the transfer function of the delta-sigma modulator is shown as the following Equation:

$$y = \frac{x}{f+1} + \frac{fQ}{f+1} \quad \text{Equation (1)}$$

In Equation (1), x represents the input signal and Q represents a quantization noise.

According to Equation (1), the integrator in the delta-sigma modulator is equivalent to a low-pass filter for the input signal and equivalent to a high-pass filter for the quantization noise when operating at low frequencies. Therefore, the output signal $S_{out}$ is substantially equal to the input signal x at low frequencies and equal to the quantization noise at high frequencies. Moreover, an oversampling technique is used by the delta-sigma modulator. Assume that the input signal x is an audio signal with a low frequency, a sampling clock with a higher frequency is used for sampling the input signal x and then the above-mentioned quantization noise is distributed over more frequency components. The noise spectrum is thus changed and most of the quantization noise is shifted beyond the frequency band of signal measurement.

Referring the DAC, the input signal x is required to be amplified with a predetermined gain by a multiplier before the input signal x enters the delta-sigma modulator. The DAC includes an up-sampling circuit, a multiplier, a gain controller, and a delta-sigma modulator. The up-sampling circuit performs an oversampling operation to raise the sampling frequency and the gain controller assigns the predetermined gain to the multiplier such that the received signal of the multiplier is amplified accordingly. The multiplier is coupled to the following up-sampling circuit. Because the sampling frequency is lower before the up-sampling circuit performs the oversampling operation, the multiplier can be implemented by adders and shifters. However, if there are many input signals with different sampling frequencies to be amplified ahead of up-sampling, a plurality of multipliers is needed. If the signal amplifying is performed after the operation of the up-sampling circuit, although only one multiplier is needed, adders and shifters are not applicable because the signal amplifying no longer can be accomplished within one sampling cycle due to the raised sampling frequency of the up-sampled signal.

SUMMARY OF THE INVENTION

It is therefore one of the objectives of the claimed invention to provide a signal processing circuit capable of changing signal levels using a shifter, a lookup table, and a simple logic circuit to thereby accomplish signal amplifying and solve the above-mentioned problem.

According to an embodiment of the present invention, a signal processing system for changing a level of an input signal to generate an output signal is disclosed. The signal processing system includes a shifter, a delta-sigma modulator, and a level adjuster. The shifter is utilized for receiving the input signal and for bit-shifting the input signal according to a first predetermined gain to generate a first adjustment signal. The delta-sigma modulator is utilized for generating the output signal according a second adjustment signal and the first adjustment. The level adjuster is utilized for adjusting a level of the output signal according to a second predetermined gain to generate the second adjustment signal.

According to an embodiment of the present invention, a signal processing method for changing a level of an input signal to generate an output signal is disclosed. The signal processing method includes: bit-shifting the input signal according to a first predetermined gain to generate a first adjustment signal; generating the output signal according to a second adjustment signal and the first adjustment signal; and adjusting a level of the output signal according to a second predetermined gain to generate the second adjustment signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
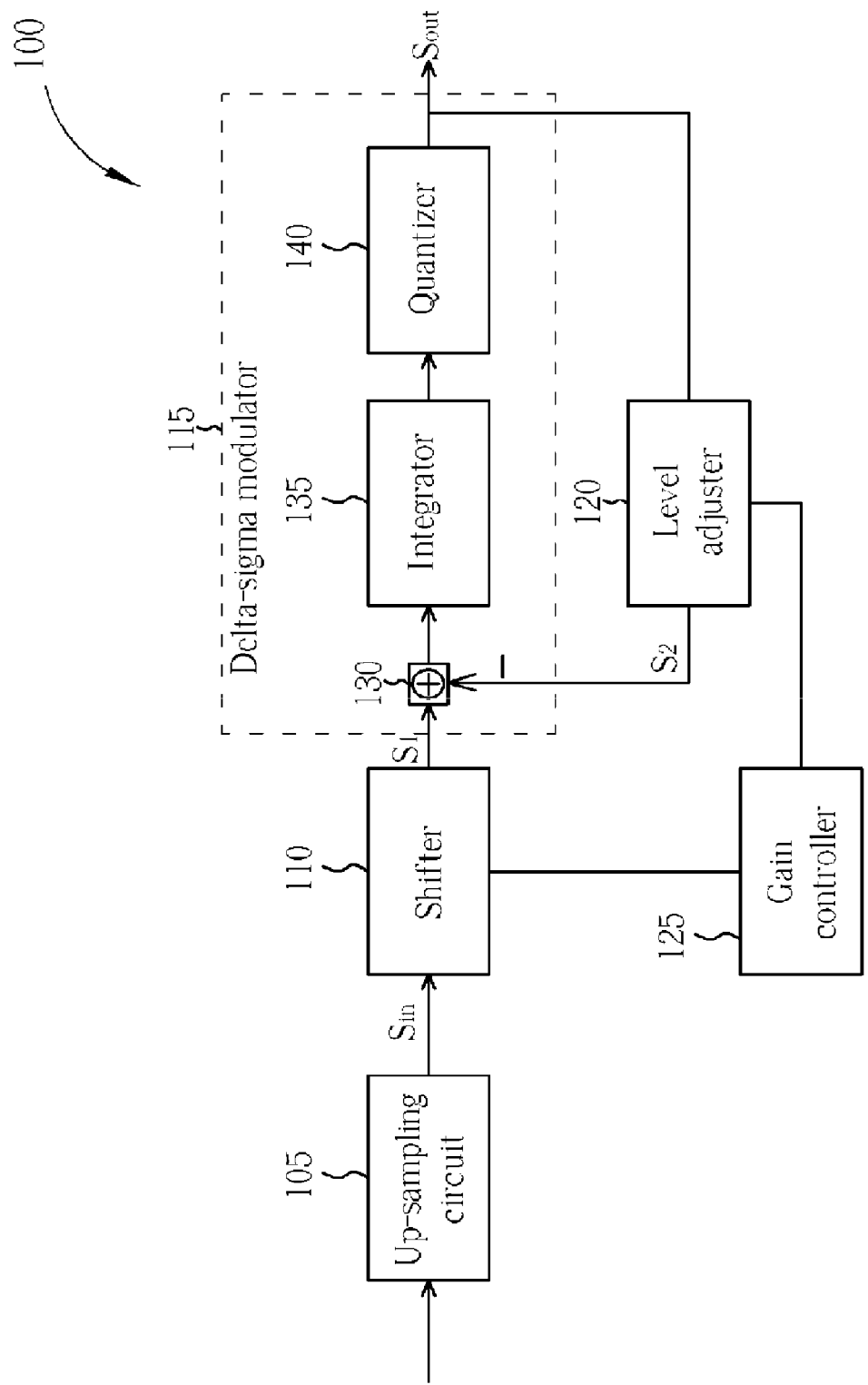
FIG. 1 is a block diagram of a signal processing system according to an embodiment of the present invention.

Please refer to FIG. 1. FIG. 1 is a block diagram of a signal processing system 100 according to an embodiment of the present invention. As shown in FIG. 1, the signal processing system 100 includes an up-sampling circuit 105, a shifter 110, a delta-sigma modulator 115, a level adjuster 120, and a gain controller 125. The delta-sigma modulator 115 includes an adder 130, an integrator 135, and a quantizer 140.

Please note that besides the delta-sigma modulation, the signal processing system 300 is also able to perform the above-mentioned signal amplifying function by using the shifter 110, the level adjuster 120, and the gain controller 125.

In this embodiment, the shifter 110 is coupled to the preceding up-sampling circuit 105, and is utilized for receiving a digital input signal $S_{in}$ and generating a first adjustment signal $S_1$. The level adjuster 120 is established on the feedback path of the delta-sigma modulator 115, for generating a second adjustment signal $S_2$ according to the output signal $S_{out}$ from the delta-sigma modulator 115. The delta-sigma modulator 115 generates the output signal $S_{out}$ according to the first adjustment signal $S_1$ and the second adjustment signal $S_2$ fed back from the level adjuster 120. Moreover, the gain controller 125 is used to assign two different gains to the shifter 110 and the level adjuster 120 according to a predetermined gain.

Assume that the input signal $S_{in}$ is required to be amplified by a gain A. The gain controller 125 assigns two different gains A1 and A2 to the shifter 110 and level adjuster 120 respectively. Then, the shifter 110 proceeds with signal amplifying using the gain A1 and the level adjuster 120 proceeds with signal amplifying using the gain A2. Additionally, in this embodiment, the gain A is equal to the product of the gains A1 and A2. Therefore the input signal $S_{in}$ is regarded as amplified with the gain A by the shifter 310 and the level adjuster 320.

Referring to signal amplifying performed by the shifter 110, take a digital signal for example, left-shifting a bit is equal to amplifying the digital signal by 6 dB, so the shifter 110 provides a gain adjustment according to part of the gain A. Therefore, the level adjuster 120 provides a gain adjustment according to the rest part of the gain A. For example, if an input signal is required to be amplified by 4.5 dB, the shifter 110 left-shifts one bit for the input signal $S_{in}$, i.e. the input signal $S_{in}$ is amplified by 6 dB, to generate the amplified first adjustment signal $S_1$. On the other hand, the gain of the output signal $S_{out}$ is amplified with −1.5 dB by the level adjuster 120, and the second adjustment signal $S_2$ will be generated and fed back to the input end. Hence, the signal amplifying degree for the whole signal processing system 100 is equivalent to 4.5 dB.

As mentioned above, the digital input signal $S_{in}$ has been over-sampled by the up-sampling circuit 105, meaning that the input signal $S_{in}$ has more bits afterward, for example, 16 bits. However, the digital output signal $S_{out}$ has fewer bits, for example, 4 bits after being processed by the quantizer 140 inside the delta-sigma modulator 115. Please note that the level adjuster 120 in the embodiment of the present invention is used to cope with the output signal $S_{out}$ having fewer bits, so the operation of the level adjuster 120 is not limited by the higher sampling frequency for the output signal $S_{out}$.

For example, because of the low required sampling frequency for the output signal $S_{out}$, it is easy to complete the operation of the adder within a sampling cycle and it is feasible to implement the level adjuster 120 by using a multiplier or an adder. These alternative designs also obey the spirit of the present invention.

Figure 2:
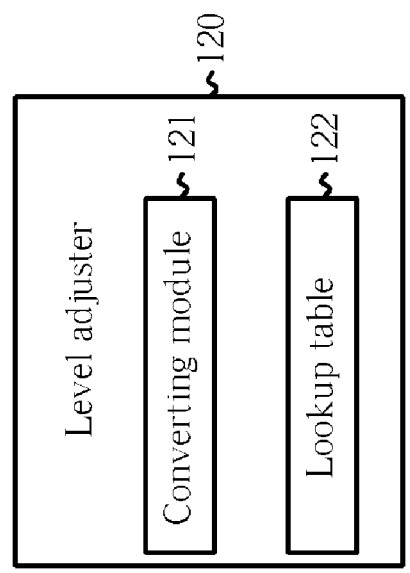
FIG. 2 is a diagram illustrating an embodiment of a level adjuster shown in FIG. 1.

Please refer to FIG. 2. FIG. 2 is a diagram illustrating an embodiment of the level adjuster 120 shown in FIG. 1. The level adjuster 120, as shown in FIG. 2, comprises a converting module 121 and a lookup table 122. The lookup table 122 stores the relationship between the output signal $S_{out}$, the gain A2, and the second adjustment signal $S_2$. Therefore, the converting module 121 can output the corresponding second adjustment signal $S_2$ by only checking the lookup table 122 according to the received output signal $S_{out}$ and the gain A2.

For example, the output signal $S_{out}$ mentioned above has 4 bits, and thus there are 16 combinations for the output signal $S_{out}$. Assume that the gain A2 can be set by one of these four gains: 0 db, −1.5 db, −3 db, and −4.5 db. As a result, there are 64 combinations for the second adjustment signal $S_2$ totally.

Apparently, owing to the number of the combinations is not very great, all of these combinations can be stored in the lookup table 122 in advance. The converting module 121, therefore, can only check the lookup table 122 to output the desired second adjustment signal $S_2$ easily and correctly.

Furthermore, designing the converting module 121 is not difficult to those skilled in this art. In practical applications, the converting module 121 can be implemented by using logic circuits, for example, multiplexers. The converting module 121 can also be implemented by processors, which references the received output signal $S_{out}$ and the gain A2 to output the desired second adjustment signal $S_2$. These alternative designs also obey the spirit of the present invention.

Please note that, in above-mentioned embodiment of the present invention, the position of the shifter 110 is not limited. In other words, the shifter 110 can be placed in other positions in the signal processing system 100 shown in FIG. 1; for example, in other embodiments, the shifter 110 can be positioned ahead of the up-sampling circuit 105, which also obeys the spirit of the present invention.

Compared to the prior art, in the above-mentioned embodiment of the present invention, the objective of the gain control can be accomplished only by a shifter, a lookup table, and a logic circuit. Obviously, cost of the gain control can be greatly reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal processing system for changing a level of an input signal to generate an output signal, the signal processing system comprising:
   an up-sampling circuit, for performing up-sampling to generate the input signal;
   a shifter for receiving the input signal and for bit-shifting the input signal according to a first predetermined gain to generate a first adjustment signal;
   a delta-sigma modulator, for generating the output signal according to a second adjustment signal and the first adjustment signal; and
   a level adjuster, for receiving the output signal and adjusting a level of the output signal according to a second predetermined gain to thereby generate the second adjustment signal to the delta-sigma modulator;
   wherein the level adjuster comprises:
      a lookup table for storing a relationship between all combinations of possible second predetermined gains, possible output signals, and corresponding second adjustment signals; and
      a converting module for receiving the output signal and the second predetermined gain, and outputting the second adjustment signal by checking the lookup table according to the received output signal and the received second predetermined gain in order to output the second adjustment signal stored in the lookup table that corresponds to the combination of the received output signal and the received second predetermined gain.

2. The signal processing system of claim 1, wherein the output signal is an audio signal.

3. The signal processing system of claim 1, further comprising:
   a gain controller, for setting the first predetermined gain and the second predetermined gain to adjust a gain of the signal processing system.

4. The signal processing system of claim 3, wherein the gain is equal to a product of the first predetermined gain and the second predetermined gain.

5. The signal processing system of claim 1, wherein the delta-sigma modulator comprises an integrator, a quantizer, and an adder.

6. The signal processing system of claim 1, wherein the first adjustment signal is generated by only bit-shifting the input signal.

7. The signal processing system of claim 1, wherein all the combinations stored in the lookup table are stored in advance.

8. A signal processing method for changing a level of an input signal to generate an output signal, the signal processing method comprising:
  performing up-sampling utilizing an up-sampling circuit to generate the input signal;
  bit-shifting the input signal according to a first predetermined gain to generate a first adjustment signal;
  generating the output signal according to a second adjustment signal and the first adjustment signal;
  receiving the output signal, and utilizing a level adjuster for adjusting a level of the output signal according to a second predetermined gain to thereby generate the second adjustment signal;
  providing a lookup table in the level adjuster for storing a relationship between all combinations of possible second predetermined gains, possible output signals, and corresponding second adjustment signals; and
  providing a converting device in the level adjuster for receiving the output signal and the second predetermined gain, and outputting from the converting device the second adjustment signal by checking the lookup table according to the received output signal and the received second predetermined gain in order to output the second adjustment signal stored in the lookup table that corresponds to the combination of the received output signal and the received second predetermined gain.

9. The signal processing method of claim 8, wherein the step of generating the output signal comprising:
  utilizing a delta-sigma modulator.

10. The signal processing method of claim 8, wherein the output signal is an audio signal.

11. The signal processing method of claim 8, further comprising:
  setting the first predetermined gain and the second predetermined gain to adjust a gain of the signal processing system.

12. The signal processing method of claim 11, wherein the gain is equal to a product of the first predetermined gain and the second predetermined gain.

13. The signal processing method of claim 8, wherein the step of bit-shifting the input signal comprises:
  generating the first adjustment signal by only bit-shifting the input signal.

14. The signal processing method of claim 8, further comprising storing all the combinations in the lookup table in advance.

* * * * *